United States Patent
Embring

[15] 3,696,192
[45] Oct. 3, 1972

[54] PEPTIZABLE BARIUM SULFATE DENTIFRICE

[72] Inventor: Paul G. Embring, Vaksalagatan 35,, Uppsala, Sweden

[22] Filed: Feb. 17, 1970

[21] Appl. No.: 12,160

[30] Foreign Application Priority Data

Feb. 27, 1969 Sweden ................2666/1969

[52] U.S. Cl.......................................424/52, 424/55
[51] Int. Cl................................................A61r 7/16
[58] Field of Search........................424/49–58, 131, 424/4

[56] References Cited

UNITED STATES PATENTS

| | | | |
|---|---|---|---|
| 1,943,467 | 1/1934 | Bley | 424/50 |
| 2,876,167 | 3/1959 | Manahan | 424/52 |
| 3,105,013 | 9/1963 | Saul et al. | 424/52 |
| 3,105,798 | 10/1963 | Holliday et al. | 424/52 |
| 3,216,900 | 11/1965 | Embring et al. | 424/4 |

*Primary Examiner*—Richard L. Huff
*Attorney*—Fred C. Philpitt

[57] ABSTRACT

The specification describes dentifrices containing sodium fluoride and particles of barium sulfate coated with tribasic sodium citrate.

7 Claims, No Drawings

PEPTIZABLE BARIUM SULFATE DENTIFRICE

The present invention relates to a dentifrice which consists of a mixture comprising sodium fluoride.

Such dentifrices are known to the art, and today dominate this particular market. Conventional tooth pastes regularly contain polishing agents (abrasives), usually calcium salts, such as chalk or calcium phosphate. These polishing agents inactivate the sodium fluoride, which is the most expedient and most tested fluoro compound, probably because calcium fluoride is formed.

It has been suggested to replace the conventional polishing agents by a suspension of small spherical plastic particles (G. Koch, Odont. Revy 18 (1967) Suppl. 2). This suspension is compatible with sodium fluoride but the polishing effect is practically negligible, which results in complaints from patients whose dentists have recommended the use of such dentifrices that their teeth are becoming discolored by dark coatings (Bengt T. Larsson, The Swedish Dental Federation's Journal 61 (1969) No. 2, p. 58–65).

It is therefore an object of the invention to provide a toothpaste which contains a polishing agent having sufficient abrasive qualities and also being compatible with sodium fluoride.

The present invention provides a solution to the aforementioned problem. The polishing agent used in accordance with the present invention is a fine-grained barium sulphate, preferably equal in quality to that normally used in X-ray examinations. In order to prevent adsorption of the fluoro compounds on the grains of barium sulphate, it has been found suitable to treat said grains with certain salts; more specifically, particularly salts of hydroxy acids, such as citric acid, whereby the capacity of barium sulphate for adsorbing other compounds is greatly suppressed, simultaneously as the important requirement that in the presence of water the composition disperses into a very fine suspension of abrasive particles is satisfied.

On the basis of the aforegoing, the present invention relates to a dentifrice consisting of a composition which contains fine-grained barium sulphate, a salt of an hydroxy acid, active as a peptizing agent for the barium sulphate, one or more alkali fluorides, and water. The dentifrice is normally in the form of a cream or a paste.

In accordance with one important embodiment of the present invention, neutral salts, for example alkali and ammonium salts of the hydroxy acid, can be used as a salt of a hydroxy acid, for peptizing the barium sulphate. One example of such hydroxy acids is polyvalent hydroxy carboxylic acids, such as citric acid, tartaric acid and malic acid. Salts of other hydroxy acids, such as pyrophosphoric acid, and in particular potassium pyrophosphate, can also be envisaged.

In accordance with one embodiment of the invention, the content of the hydroxy acid salt in the combination of the salt and the barium sulphate lies between 0.1 and 5 percent by weight, preferably between 0.1 and 2 percent by weight.

The dentifrice of the present invention may also contain facultative ingredients. Thus it may also contain water retaining substances, such as glycerol in particular. If glycerol is included in the composition, it may be used in proportions of up to 40 percent by weight.

The dentifrice of the present invention may also contain varying quantities of water, which also facilitates suspension of the dentifrice when used. The content of water in the dentifrice may lie within wide limits, for example between 5 and 90 percent by weight.

In accordance with one embodiment of the invention, wetting agents may also be added to the composition. Particularly sodium lauryl sulphoacetate and sodium lauryl sulphate are two examples of such agents. It may be to advantage if the wetting agents are present in a gelatinized form. For this purpose, the composition can include sodium chloride as a gelation agent. When sodium chloride is used, it may be added in quantities of up to 3 percent by weight.

The dentifrice of the present invention also conditionally contains one or more alkali fluorides in relatively small quantities. The content of alkali fluoride may lie between 0.05 and 2 percent by weight, preferably between 0.05 and 1 percent by weight.

The dentifrice of the present invention may also contain other ingredients. Thus, it can be to advantage to include sorbitol in the composition, since this compound cooperates with, for example, sodium citrate and thereby lowers the viscosity of the composition which may be to advantage from manufacturing point of view. Since such a composition has a low viscosity, it can readily be homogenized by passing it through a colloid mill. The reason why the composition can be finely dispersed in this way is because it is pumpable.

One advantage afforded by the dentifrice of the invention and which can be ascribed to the content of barium salt coated with a salt of hydroxy acid is that it does not require the addition of conventional thickeners when being manufactured. If the homogenized, low viscous suspension of barium sulphate is mixed with a wetting agent, suitably sodium lauryl sulphoacetate or sodium lauryl sulphate, and a minor quantity of sodium chloride as a gelation agent, the composition need not be whisked or stirred to such an extent that air will be introduced into the same. The present invention thus also facilitates problems associated with the manufacture of dentifrices.

The term "dentifrice" is used here and in the appended claims, to identify a composition used for cleaning the teeth and mouth. All percentages recited in the description and claims are in per cent by weight based on the whole composition, i.e., the weight of the dentifrice.

The invention is further illustrated by the following specific examples.

EXAMPLE 1

A composition I was prepared from the following ingredients:

| | |
|---|---|
| Barium sulphate of X-ray quality | 550 g |
| Sodium citrate, tribasic | 10 g |
| Sorbitol (70 % solution) | 150 g |
| Water | 150 g. |

A composition II was then prepared from the following ingredients:

| | |
|---|---|
| Saccharin | 1 g |
| Peppermint oil | 12.5 g |
| Sodium lauryl sulphoacetate | 20 g |
| Sodium chloride | 10 g |
| Sodium fluoride | 0.2 g |
| Water, distilled to | 1000 g. |

In preparing composition I, the barium sulphate is stirred in 100 g of water and the sorbitol, whereafter the sodium citrate, dissolved in the least possible quantity of water, is added. The resulting suspension is then homogenized.

In preparing composition II, the sodium lauryl sulphoacetate is stirred in 50 g of water. The saccharin and oil of peppermint is then added, whereafter the sodium chloride and sodium fluoride dissolved in the remainder of the water are also added.

Composition II is then added to composition I, whereupon a final composition is obtained which takes the consistency of a paste without appreciable stirring being required.

The paste like product thus obtained is found to make a splendid dentifrice since, when used, it is transformed into a fine suspension in which the sodium fluoride is dissolved.

EXAMPLE 2

A dentifrice was prepared in the same manner as that described in Example 1 except that in mixture I 150 g of glycerin was added instead of 150 g of water.

As with Example 1, a dentifrice was obtained which presented splendid suspension properties when used. It was also found that the product could be stored without drying out.

EXAMPLE 3

In a manner similar to that described in Example 1, a dentifrice in the form of a toothpaste was formed by mixing together the following ingredients:

| | |
|---|---|
| Barium sulphate, X-ray quality | 570 g |
| Sodium citrate, tribasic | 10 g |
| Glycerol | 100 g |
| Sorbitol, 70 % solution | 180 g |
| Saccharin | 1 g |
| Oil of eucalyptos | 10 g |
| Sodium lauryl sulphate | 25 g |
| Sodium chloride | 10 g |
| Sodium fluoride | 0.6 g |
| Distilled water to | 1000 g. |

The toothpaste obtained presented splendid ability to form a fine suspension when used. The sodium fluoride was found dissolved in the water phase of the suspension and could thus effectively be brought into contact with the teeth.

EXAMPLE 4

A toothpaste was prepared in the same manner as that described in Example 3, although in this instance the peptizing agent for the barium sulphate was potassium sodium tartrate instead of sodium citrate, while sodium lauryl sulphoacetate was used instead of sodium lauryl sulphate. Other commercially available flavoring agents were used instead of eucalyptus oil.

The ability of the resultant toothpaste to form a fine-grain suspension with water, in which the sodium fluoride was dissolved, was found to be high.

EXAMPLE 5

A dentifrice was prepared in a manner similar to that described in Example 4, although in this instance 6.5 g of malic acid and 4 g of sodium bicarbonate were used instead of the potassium sodium tartrate.

The ability of the resultant toothpaste in particular to form a fine-grain suspension when mechanically activated in the presence of water was found to be high. The sodium fluoride was found in solution in the water.

EXAMPLE 6

A dentifrice was prepared in a manner similar to that described in Example 5, although in this instance 10 g of potassium pyrophosphate were used instead of 6.5 g of malic acid and 4 g of sodium bicarbonate.

The ability of the toothpaste in particular to form a fine-grained suspension when mechanically worked upon in the presence of water was found to be high. The sodium fluoride was found in solution in the water.

What I claim is:

1. A dentifrice consisting essentially of sodium fluoride, water, and pulverent barium sulfate of X-ray quality, the particles of said barium sulfate being coated with tribasic sodium citrate, the foregoing components of the dentifrice being present in approximately the following weight ratios:

sodium fluoride 0.2 parts
   barium sulfate 550 parts
   water 150 parts
   sodium citrate 10 parts 2. A composition as claimed in claim 1 wherein the amount of salt is within the range of 0.1–2 percent based on the combined weight of salt and barium sulfate.

3. A composition as claimed in claim 1 wherein glycerol is present in an amount up to 40 percent by weight.

4. A composition as claimed in claim 1 wherein a wetting agent is present in an amount up to 15 percent by weight.

5. A dentifrice composition which consists essentially of:
   a. a small amount of at least one alkali metal fluoride,
   b. between about 5 percent and about 90 percent by weight of water,
   c. pulverulent barium sulfate,
   d. the particles of said barium sulfate being coated with a neutral therapeutically acceptable salt,
   e. said salt being selected from the group consisting of alkali metal citrates, tartrates and malates; ammonium citrates, tartrates and malates; alkali metal pyrophosphates; and ammonium pyrophosphates, and
   f. the amount of said salt being within the range of 0.1–5 percent based on the combined weight of salt and barium sulfate.

6. A dentifrice composition consisting essentially of:
   a. a small amount of at least one alkali metal fluoride;
   b. between about 5 percent and 90 percent by weight of water;
   c. pulverulent barium sulfate;
   d. the particles of said barium sulfate being coated with a neutral therapeutically acceptable salt; said salt being selected from the group consisting of alkali metal citrates, tartrates and malates; ammonium citrates, tartrates and malates; alkali metal pyrophosphates and ammonium pyrophosphates;
   e. the amount of said salt being within the range of 0.1–5 percent based on the combined weight of salt and barium sulfate;
   f. up to 40 percent by weight glycerol; and g. not more than about 15 percent by weight of a wetting agent selected from the group consisting of sodium lauryl sulfoacetate and sodium lauryl sulfate.

7. A composition as claimed in claim 6, wherein sodium chloride is present in an amount up to 3 percent by weight.

* * * * *

UNITED STATES PATENT OFFICE
CERTIFICATE OF CORRECTION

Patent No. 3,696,192　　　　　　　　Dated　October 3, 1972

Inventor(s)　Paul G. Embring

It is certified that error appears in the above-identified patent and that said Letters Patent are hereby corrected as shown below:

On the cover sheet insert -- [73] Assignee: Medisan AB --.

Signed and sealed this 17th day of April 1973.

(SEAL)
Attest:

EDWARD M. FLETCHER, JR.　　　　　　　ROBERT GOTTSCHALK
Attesting Officer　　　　　　　　　　Commissioner of Patents